United States Patent
Davidson et al.

(10) Patent No.: US 10,263,924 B1
(45) Date of Patent: Apr. 16, 2019

(54) MESSAGE SELECTION AND PRESENTATION IN A REAL-TIME MESSAGING PLATFORM

(71) Applicant: Twitter, Inc., San Francisco, CA (US)

(72) Inventors: Michael Davidson, San Francisco, CA (US); Joshua Brewer, San Francisco, CA (US); David DeSandro, Brooklyn, NY (US); Erin Nolan, Brooklyn, NY (US); Geoffrey Brown, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 337 days.

(21) Appl. No.: 14/067,061

(22) Filed: Oct. 30, 2013

(51) Int. Cl.
*G06F 15/16* (2006.01)
*H04L 12/58* (2006.01)

(52) U.S. Cl.
CPC .................. *H04L 51/046* (2013.01)

(58) Field of Classification Search
CPC ..... G06Q 10/107; H04L 12/585; H04L 12/58; H04L 12/581
USPC ........................................................ 709/206
See application file for complete search history.

(56) References Cited

U.S. PATENT DOCUMENTS

| | | | |
|---|---|---|---|
| 7,593,995 B1 | 9/2009 | He et al. | |
| 9,483,529 B1 | 11/2016 | Pasoi et al. | |
| 2003/0090524 A1 | 5/2003 | Segerberg et al. | |
| 2004/0153512 A1* | 8/2004 | Friend | G06Q 30/02 709/206 |
| 2007/0143435 A1 | 6/2007 | Daigle et al. | |
| 2007/0203991 A1 | 8/2007 | Fisher et al. | |
| 2011/0004831 A1 | 1/2011 | Steinberg et al. | |
| 2011/0119258 A1 | 5/2011 | Forutanpour et al. | |
| 2011/0289088 A1* | 11/2011 | Yarin | G06F 17/30864 707/738 |
| 2013/0086180 A1* | 4/2013 | Midgen | H04L 12/5855 709/206 |
| 2013/0162515 A1 | 6/2013 | Prociw et al. | |
| 2013/0297604 A1* | 11/2013 | Sutedja | G06Q 10/107 707/737 |
| 2014/0280616 A1 | 9/2014 | Ramanathan et al. | |
| 2014/0324999 A1 | 10/2014 | Dan et al. | |
| 2015/0334068 A1* | 11/2015 | Liu | G06Q 10/107 707/738 |

* cited by examiner

*Primary Examiner* — Alan S Chou
(74) *Attorney, Agent, or Firm* — Fish & Richardson P.C.

(57) ABSTRACT

A system and message for message selection and presentation, including: receiving a request for content, wherein the request is associated with a context account of a messaging platform; identifying a set of unviewed messages associated with the context account; identifying grouping criteria for grouping content based on messages; applying, by a computer processor, the grouping criteria to the unviewed messages to generate a content group, wherein the content group is associated with a subset of the unviewed messages; and providing at least a portion of the content group in response to the request.

42 Claims, 7 Drawing Sheets

MESSAGE SELECTION AND PRESENTATION IN A REAL-TIME MESSAGING PLATFORM

BACKGROUND

The development and proliferation of sophisticated mobile computing devices such as smart phones and tablets have likely contributed to a sudden rise in the usage of social networking messaging platforms and applications. With increasingly powerful computing devices and extensive mobile networks, social networking has become available at any time and almost everywhere. Popular messaging platforms often provide functionality for users to draft and send messages (both synchronously and asynchronously) to other users. Other common features include the ability to "post" messages that are visible to one or more identified other users of the platform, or even publicly to any user of the platform without specific designation by the authoring user.

SUMMARY

In general, in one aspect, the invention relates to a method for message selection. The method can include: receiving a request for content, wherein the request is associated with a context account of a messaging platform; identifying a set of unviewed messages associated with the context account; identifying grouping criteria for grouping content based on messages; applying, by a computer processor, the grouping criteria to the unviewed messages to generate a content group, wherein the content group is associated with a subset of the unviewed messages; and providing at least a portion of the content group in response to the request.

In general, in one aspect, the invention relates to a system for message selection. The system can include: a computer processor; a content-analysis module executing on the computer processor and configured to: receive a request for content, wherein the request is associated with a context account; identify a set of unviewed messages associated with the context account; identify grouping criteria for grouping content based on messages; apply the grouping criteria to the unviewed messages to generate a content group, wherein the content group is associated with a subset of the unviewed messages; and provide at least a portion of the content group in response to the request.

In general, in one aspect, the invention relates to a system for message selection. The system can include: receiving a portion of a content group by a client device, wherein the content group was generated by applying grouping criteria for grouping content based on unviewed messages from a stream of a user account of a messaging platform; displaying, by the client device, the portion of the content group in reverse chronological order concurrently with an indication of additional content of the content group; receiving, by the client device, a selection of the user interface element; and displaying, by the client device, at least some of the additional content of the content group in response to the selection.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the invention provide a method and system for selecting content based on unviewed messages of a messaging platform. One or more criteria for grouping the content is identified and applied to the unviewed messages. Based on the criteria, one or more content groups are generated representing content associated with a subset of the unviewed messages.

Figure 1A:
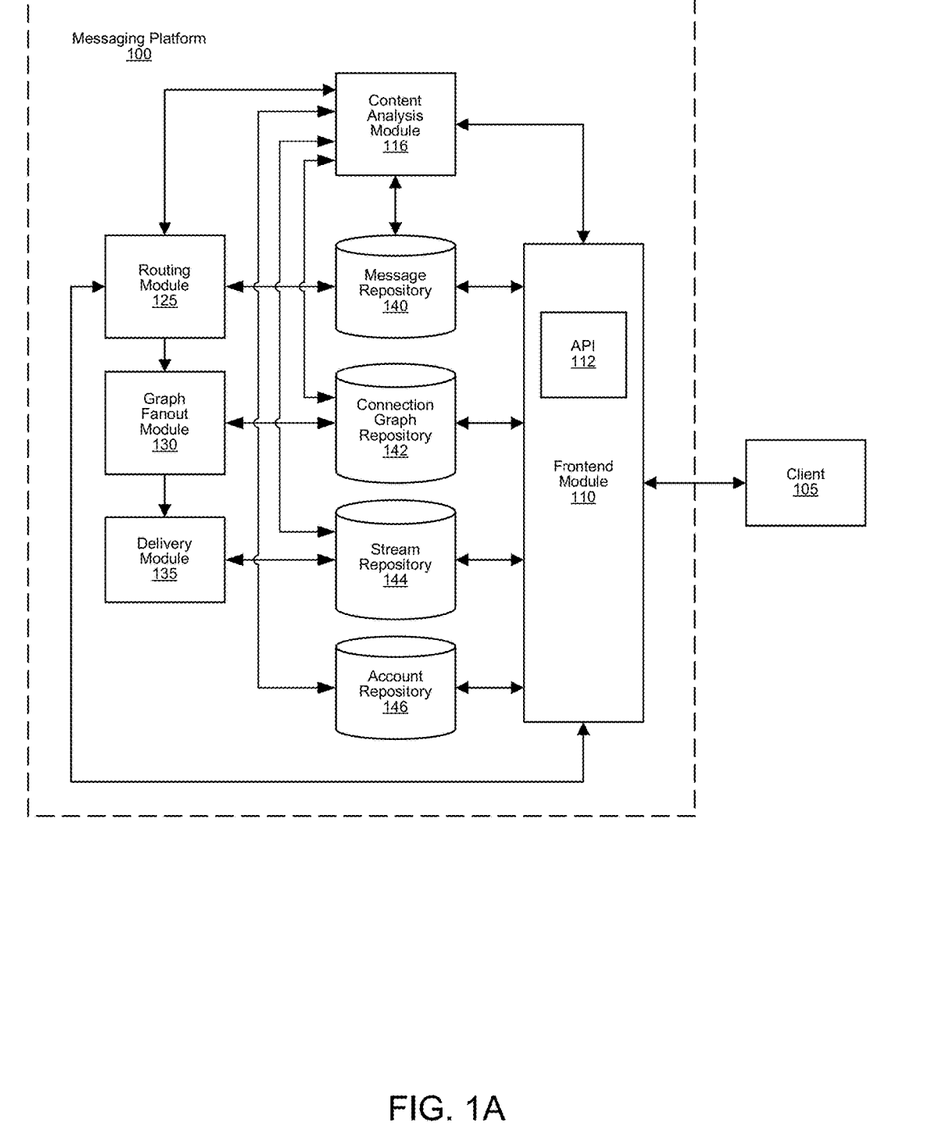
FIG. 1A shows a schematic diagram of a system, in accordance with one or more embodiments of the invention.

FIG. 1A shows a messaging platform (100) and a client (105) in accordance with one or more embodiments of the invention. As shown in FIG. 1A, the messaging platform (100) has multiple components including a frontend module (110) with an application programming interface (API) (112), a content analysis module (116), a routing module (125), a graph fanout module (130), a delivery module (135), a message repository (140), a connection graph repository (142), a stream repository (144), and an account repository (146). Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments of the invention, the messaging platform (100) is a platform for facilitating real-time communication between one or more entities. For example, the messaging platform (100) may store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). The messaging platform (100) may be configured to enable users to communicate in "real-time", i.e., to converse with other users with a minimal delay and to conduct a conversation with one or more other users during simultaneous sessions. In other words, the messaging platform (100) may allow a user to broadcast messages and may display the messages to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of the messaging platform (100). In this case, the messaging platform (100) may be configured to allow the user to broadcast messages and/or to utilize other functionality of the messaging platform 100 by associating the user with a temporary account or identifier.

In one or more embodiments of the invention, the content analysis module (116) includes functionality to generate one or more content groups, each including content associated with a subset of unviewed messages of an account of the messaging platform (100). Relationships between accounts of the messaging platform (100) can be represented by a connection graph.

Figure 1B:
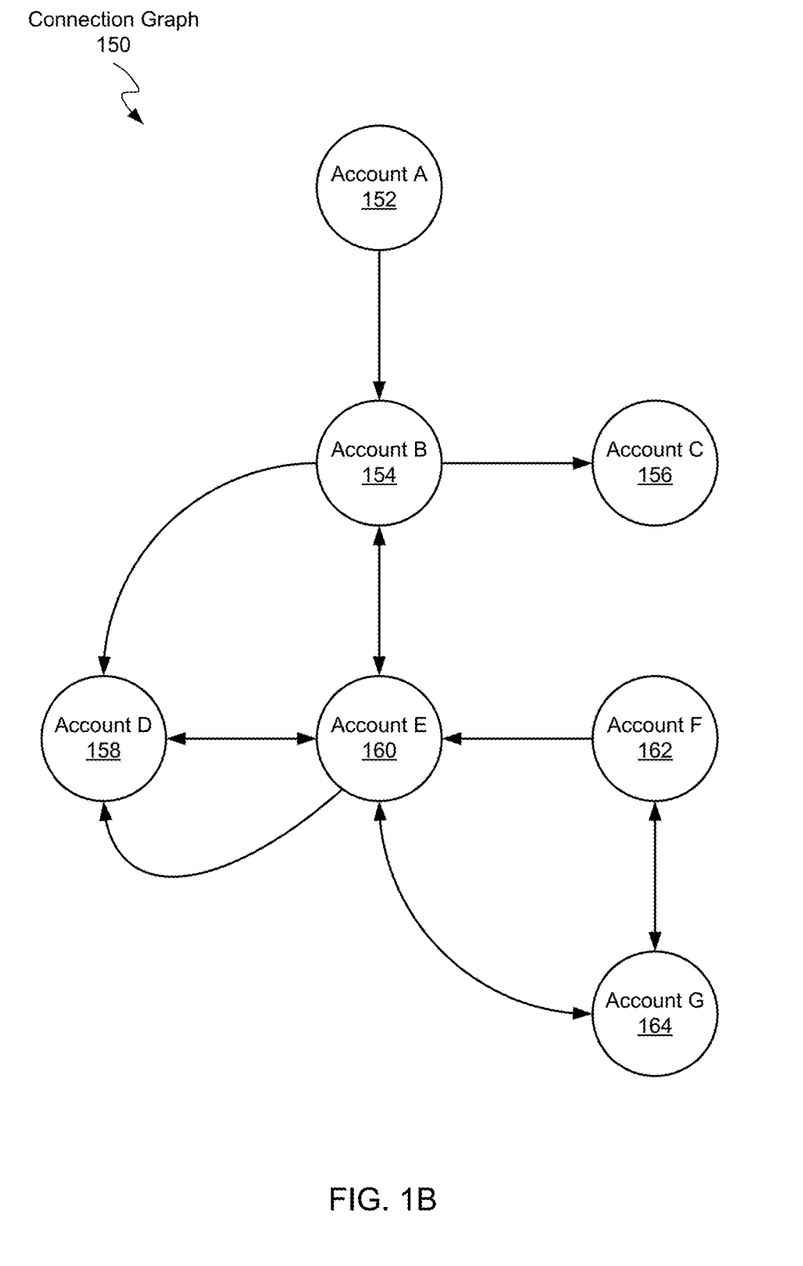
FIG. 1B shows an example depiction of a connection graph in accordance with one or more embodiments of the invention.

FIG. 1B shows an example depiction of a connection graph (150) in accordance with one or more embodiments of the invention. In one or more embodiments of the invention, the connection graph repository (142) is configured to store one or more connection graphs. As shown in FIG. 1B, the connection graph (150) includes multiple components including nodes representing accounts of the messaging platform (100) (i.e., Account A (152), Account B (154), Account C (156), Account D (158), Account E (160), Account F (162), Account G (164)) and edges connecting the various nodes.

The connection graph (150) is a data structure representing relationships (i.e., connections) between one or more accounts. The connection graph (150) represents accounts as nodes and relationships as edges connecting one or more nodes. A relationship may refer to any association between the accounts (e.g., following, friending, subscribing, tracking, liking, tagging, and/or etc.). The edges of the connection graph (150) may be directed and/or undirected based on the type of relationship (e.g., bidirectional, unidirectional), in accordance with various embodiments of the invention.

Many messaging platforms include functionality to broadcast streams of messages to one or more accounts based at least partially on a connection graph representing relationships between those accounts (see FIG. 1B). A stream may be a dynamic list of messages associated with one or more accounts or can reflect any arbitrary organization of messages that is advantageous for the user of an account. For purposes of this disclosure, a "message" can include a user authored message and/or any content (multimedia, text, etc.) broadcasted/posted by an account of a messaging platform.

Returning to FIG. 1A, in one or more embodiments of the invention, the content analysis module (116) includes functionality to receive a request for content. For example, the content analysis module (116) may receive a request for content from a client (105). The content analysis module (116) may receive the request through the frontend module (110) and/or the API (112). In another example, the content analysis module (116) receives a request for content from a module or component within the messaging platform (100).

In one or more embodiments of the invention, the request may be associated with a context account. The context account can be any account associated with and/or relevant to a request for content. In one example, the context account is an account of a user for which content is requested. In another example, the context account is an account or authoring account of a message from which a link was selected resulting in the request.

In one or more embodiments of the invention, the content analysis module (116) includes functionality to identify a set of unviewed messages associated with the context account. For example, the message repository (140), which may be any storage configured to store broadcasted (or ready to broadcast) messages of the messaging platform (100), may store messages that are associated with the context account (e.g., messages within the connection graph of the context account). One or more of the messages associated with the context account may have been viewed by the context account, while one or more of the messages associated with the context account may not have been viewed by the context account. The content analysis module (116) may identify the unviewed messages associated with the context account.

In one or more embodiments of the invention, the content analysis module (116) includes functionality to identify grouping criteria for grouping content based on messages. The grouping criteria may be used to identify content associated with favorite accounts, message highlights in a stream of messages, popular stories represented by messages, message topics in a stream of messages, and/or any other grouping criteria that may be considered to group content.

In one or more embodiments of the invention, the content analysis module (116) includes functionality to apply the grouping criteria to the unviewed messages to generate a content group. A content group may refer to any grouping of content associated with messages of the messaging platform (100), in accordance with various embodiments of the invention.

In one or more embodiments of the invention, the content analysis module (116) includes functionality to apply criteria that can be used to form one or more content groups based on one or more favorite accounts associated with the context account. In one or more embodiments of the invention, the content analysis module (116) includes functionality to form each content group with messages that are associated with and/or authored by the favorite accounts and unviewed by the context account.

In one or more embodiments of the invention, the content analysis module (116) includes functionality to identify a set of favorite accounts using one or more criteria. For example, the content analysis module (116) can identify a set of favorite accounts based on an indication of favorite accounts by the context account, a predefined graph relationship between user accounts and the context account, a frequency and/or recency of engagement between user accounts and the context account, a frequency and/or recency of visits of profile pages of user accounts by the context account, geographical locations of user accounts and the context account, a geographical proximity between user accounts and the context account, and/or popularity scores of the user accounts within the context account's connection graph or within the messaging platform. A criterion used to identify a set of favorite accounts may be referred to as a favorite accounts criterion.

In one or more embodiments of the invention, the content analysis module (116) includes functionality to rank, based on the criteria, one or more of the user accounts to identify the set of favorite accounts. For example, the content analysis module (116) can be configured to rank authoring accounts of one or more unviewed messages. In one or more embodiments of the invention, the content analysis module (116) includes functionality to associate a ranking score with each of the ranked accounts based on the user account ranking. For example, the content analysis module (116) may rank the user accounts and classify a top percentage (e.g., top 5% of user accounts) and/or amount (e.g., top 10 user accounts) of the user accounts as favorite accounts based on their ranking scores.

In one or more embodiments of the invention, the content analysis module (116) includes functionality to rank content associated with the favorite accounts. For example, the content analysis module (116) may rank content (e.g., unviewed messages) associated with the favorite accounts and unviewed by the context account. In one or more embodiments of the invention, the content analysis module (116) includes functionality to rank the content based on one or more criteria. For example, the content analysis module (116) can rank content based on a ranking score of a favorite account associated with the content, a recency of broadcasting of the content, a recency and/or frequency of engagement with the content by a favorite account, geographical locations of a broadcasting account and/or the context account, and/or a geographical proximity between a broadcasting account and the context account. A criterion used to rank the content may be referred to as a message criterion.

In one or more embodiments of the invention, the content analysis module (116) includes functionality to calculate a ranking score for the content associated with the favorite accounts. The ranking score can be calculated based on a mathematical function of the ranking criteria. The content analysis module (116) may rank the content and classify a top percentage (e.g., top 5% of messages) and/or amount (e.g., top 10 messages) of the content based on a ranking score.

In one or more embodiments of the invention, the content analysis module (116) includes functionality to rank content (e.g., individual messages) based on one or more engagement values. Engagement values can be associated with a message. Examples of an engagement value associated with a message can include, but are not limited to, a number of rebroadcasts of a message by other accounts of the messaging platform, a number of favorites/likes of a message by other accounts of the messaging platform, a number of responses to a message by other accounts of the messaging platform, a number of mentions or references of an authoring account of an unviewed message by other accounts of the messaging platform, a number of followers/connections/friends of the authoring account within the context account's connection graph, an indication of a favorite account by the context account, prior engagement with a conversation including one or more unviewed messages by the context account, and/or an amount of any other activity associated with one or more unviewed messages.

In one or more embodiments of the invention, the content analysis module (116) includes functionality to weight differently the different content ranking criteria used to rank and form the content group. For example, the content analysis module (116) may place more weight on the geographical proximity between the broadcasting account and the context account than the recency of broadcasting of the content. In one or more embodiments of the invention, the content analysis module (116) includes functionality to weight one or more messages based on engagement values associated with the message(s). Thus, for example, messages having a higher engagement value can be weighted more heavily than those having a lower engagement value.

In one or more embodiments of the invention, the content analysis module (116) includes functionality to select content unviewed by the context account and associated with the favorite accounts to form the content group. For example, the content analysis module (116) can select content from the top percentage or amount of favorite accounts to form the content group.

In one or more embodiments of the invention, the content analysis module (116) includes functionality to select content based on the ranking score of the content to form the content group. For example, the content analysis module (116) can select the top percentage or amount of content associated with each top favorite account to form the content group In one or more embodiments of the invention, the content analysis module (116) includes functionality to select a subset of unviewed messages from a message stream of the context account for inclusion in a content group. The stream may include content broadcasted by or engaged with by accounts having a predefined graph relationship with the context account in the connection graph.

In one or more embodiments of the invention, the content analysis module (116) includes functionality to select the subset of unviewed messages from the stream using one or more criteria. For example, the content analysis module (116) can select the subset of unviewed messages based on a frequency and/or recency of engagement between a broadcasting account of the message and the context account, one or more engagement values associated with the unviewed message, a frequency and/or recency of visits to a profile page of a broadcasting account or of accounts engaging with the message by the context account, a number of followers of a broadcasting account in the context account's connection graph (account overlap), geographical locations of a broadcasting account and the context account, a geographical proximity between a broadcasting account and the context account, and/or a popularity score of a broadcasting or engaging user account within the context account's connection graph or within the messaging platform. A criterion used to select the subset of unviewed messages from the stream may be referred to as a message criterion.

In one or more embodiments of the invention, the content analysis module (116) includes functionality to rank, based on the criteria, some or all of the stream content unviewed by the context account. In one or more embodiments of the invention, the content analysis module (116) includes functionality to associate a ranking score with the ranked stream content based on the ranking. For example, the content analysis module (116) can assign a higher ranking score to messages if the broadcasting account of the message is a favorite account of the context account as opposed to an account not in the context account's connection graph at all. Further, the content analysis module (116) can assign a higher ranking score to messages if the broadcasting account of the message is rated as the top favorite account of the context account as opposed to the fifth favorite account.

In one or more embodiments of the invention, the content analysis module (116) includes functionality to select stream content, unviewed by the context account, to form the content group. For example, the content analysis module (116) may rank all unviewed messages from a user's stream and include a top percentage (e.g., top 5% messages) and/or number (e.g., top 10 messages) of the messages in a "stream highlights" content group.

In one or more embodiments of the invention, the content analysis module (116) includes functionality to rank content (e.g., individual messages) based on one or more engagement values. Engagement values can be associated with a message. Examples of an engagement value associated with a message can include, but are not limited to, a number of rebroadcasts of a message by other accounts of the messaging platform, a number of favorites/likes of a message by other accounts of the messaging platform, a number of responses to a message by other accounts of the messaging platform, a number of mentions or references of an authoring account of an unviewed message by other accounts of the messaging platform, a number of followers/connections/friends of the authoring account within the context account's connection graph, an indication of a favorite account by the context account, prior engagement with a conversation including one or more unviewed messages by the context account, and/or an amount of any other activity associated with one or more unviewed messages.

In one or more embodiments of the invention, the content analysis module (116) includes functionality to weight differently the different criteria used to rank and form the content group. For example, the content analysis module (116) may place more weight on the geographical proximity between the broadcasting account and the context account than the recency of broadcasting of the content. In one or more embodiments of the invention, the content analysis module (116) includes functionality to weight one or more messages based on engagement values associated with the message(s). Thus, for example, messages having a higher engagement value can be weighted more heavily than those having a lower engagement value.

In one or more embodiments of the invention, the content analysis module (116) includes functionality to select content, unviewed by the context account, based on the ranking score of the content. For example, the content analysis module (116) can select content from the top percentage or amount of favorite accounts to form the content group.

In one or more embodiments of the invention, the content analysis module (116) includes functionality to apply criteria that can be used to form content groups based on stories unviewed by the context account and broadcasted or engaged with by user accounts in the context account's connection graph. A story can refer to any type of document, link, article, web page, and/or other content referenced by one or more messages (e.g., a URL). In one or more embodiments of the invention, the content analysis module (116) includes functionality to group content associated with popular uniform resource locators (URLs) and/or other references shared across messages of the messaging platform in accordance with various embodiments. For example, the content analysis module (116) can be configured to create a content group including highest ranked URLs identified among unviewed messages associated with a context account.

In one or more embodiments of the invention, the content analysis module (116) includes functionality to form the content group of popular stories using one or more criteria. For example, the content analysis module (116) can form the content group based on whether the broadcasting account of story content or a user account in the context account's connection graph engaging with the story content is a favorite account of the context account, geographical locations of a broadcasting account or engaging user accounts in the context account's connection graph and the context account, a geographical proximity between a broadcasting or engaging user accounts in the context account's connection graph and the context account, engagement with the story content by user accounts within the context account's connection graph or within the messaging platform, and/or a popularity score of a broadcasting account or engaging user accounts within the context account's connection graph or within the messaging platform. A criterion used to form the content group of popular stories may be referred to as a stories criterion.

In one or more embodiments of the invention, the content analysis module (116) includes functionality to rank, based on the criteria, one or more of the popular stories. In one or more embodiments of the invention, ranking the popular stories can involve calculating a ranking score for each popular story or a group of popular stories. For example, the content analysis module (116) can assign a higher ranking score to stories if the broadcasting account of the story is a favorite account of the context account as opposed to an account not in the context account's connection graph at all. Further, the content analysis module (116) can assign a higher ranking score to stories if the broadcasting account is rated as the top favorite account of the context account as opposed to the fifth favorite account.

In one or more embodiments of the invention, the content analysis module (116) includes functionality to select popular stories for inclusion in a content group. For example, the content analysis module (116) can rank all unviewed messages authored by accounts in the connection graph of a context account (or within a predefined degree of separation from the context account) to identify a set of stories. The content analysis module (116) can then include content associated with a top percentage (e.g., top 5% of stories) and/or number (e.g., top 10 stories) of the stories in a content group. For example, a highly engaged message corresponding to each story can be included in the content group (e.g., even if the message was not in the list of unviewed messages of the context account).

In one or more embodiments of the invention, the content analysis module (116) includes functionality to rank content (e.g., stories) based on one or more engagement values. Engagement values can be associated with a message. Examples of an engagement value associated with a message can include, but are not limited to, a number of rebroadcasts of a message by other accounts of the messaging platform, a number of favorites/likes of a message by other accounts of the messaging platform, a number of responses to a message by other accounts of the messaging platform, a number of mentions or references of an authoring account of an unviewed message by other accounts of the messaging platform, a number of followers/connections/friends of the authoring account within the context account's connection graph, an indication of a favorite account by the context account, prior engagement with a conversation including one or more unviewed messages by the context account, and/or an amount of any other activity associated with one or more unviewed messages.

In one or more embodiments of the invention, the content analysis module (116) includes functionality to weight differently the different criteria used to rank and form the content group. For example, the content analysis module (116) may place more weight on the geographical proximity between the broadcasting account and the context account than the recency of broadcasting of the story. In one or more embodiments of the invention, the content analysis module (116) includes functionality to weight one or more stories based on engagement values associated with the message(s) referring to the stories. Thus, for example, stories having a higher engagement value can be weighted more heavily than those having a lower engagement value.

In one or more embodiments of the invention, the content analysis module (116) includes functionality to select story content, unviewed by the context account, based on the ranking score of the story content. For example, the content analysis module (116) can select content from the top percentage or amount of stories to form the content group.

In one or more embodiments of the invention, the content analysis module (116) includes functionality to identify one or more topics based on one or more viewed or unviewed messages. In one or more embodiments of the invention, the content analysis module (116) can identify content associated with topics for inclusion in one or more content groups. For example, the content analysis module (116) can apply criteria that can be used to form a content group of unviewed messages associated with an identified topic.

In one or more embodiments of the invention, the content analysis module (116) includes functionality to identify a set of topics associated with accounts (account-based topics) and/or individual messages (message-based topics). For example, the content analysis module (116) can identify a set of topics based on words or phrases that appear in a context user's stream of messages and/or words or phrases that appear in content unviewed by the context account, one or more predefined topic lists associating each account with one or more topics (e.g., based on profile information, authored content, etc.), one or more lookup tables storing words and phrases associated with a group of topics, one or more word graphs storing words and phrases associated with a group of topics and a degree of association with each topic of the group of topics, and/or predetermined words or phrases.

In one or more embodiments of the invention, the content analysis module (116) includes functionality to rank the set of topics and/or the topic-related content based on one or more criteria. For example, the content analysis module (116) can rank topics based on a recency of a viewing of content related to topics by the context account and/or a frequency of viewing of content related to the topics by the context account, engagement with or broadcasting of content related to topics by a favorite account of the context account, geographical locations of the context account and the authoring account of the content, and/or a geographical proximity between the context account and the authoring account of the content. In another example, the content analysis module (116) can rank topics and/or topic-related content based on engagement with or broadcasting of content related to topics by the context account and/or by user accounts within the connection graph of the context account. In this example, if the context account is connected to a significantly large number of accounts associated with a topic X (in the connection graph), then unviewed content associated with topic X is ranked proportionally higher. In one or more embodiments of the invention, the content analysis module (116) includes functionality to rank the set of topics includes determining an average ranking score for each topic of the set of topics based on ranking scores for individual messages of each of the set of topics. A criterion used to rank the set of topics and/or the topic-related content may be referred to as a topics criterion.

In one or more embodiments of the invention, the content analysis module (116) includes functionality to select a subset of topics representing highly ranked topics. For example, the content analysis module (116) can form content groups representing a set of topics that include highly ranked content. The content analysis module (116) can form the content groups based on a high ranking of an individual content item within a topic or a high average ranking of content within a topic. In one or more embodiments of the invention, the content analysis module (116) includes functionality to select the a subset of topics by applying a weighted interest score for each topic of the set of topics, where the weighted interest score is an estimate of user interest in the topic. The content analysis module (116) can then provide top ranked content within each topic's content group.

For example, the content analysis module (116) can group messages based on relevancy to a topic and then ranked within that group based on engagement (e.g., one or more engagement values), credibility of the authoring account, and any number of other criteria. In this example, the content analysis module (116) is configured to select a subset of the highest ranked content for inclusion in each topic's content group. In another example, the content analysis module (116) can provide content (e.g., messages) associated with highly ranked stories and/or broadcasted by favorite accounts associated with the context account.

In one or more embodiments of the invention, the content analysis module (116) includes functionality to rank the set of topics and include a top percentage (e.g., top 5%) and/or number (e.g., top 10) of the topics in the set of topics. In one or more embodiments of the invention, the content analysis module (116) includes functionality to rank some or all of the topic-related content and include a top percentage (e.g., top 5%) and/or number (e.g., top 10) of the topic-related content in their respective content groups. In one or more embodiments of the invention, the content analysis module (116) includes functionality to rank topics and/or individual messages within those topics based on one or more engagement values.

Engagement values can be associated with a topic. Examples of an engagement value associated with a topic can include, but are not limited to, aggregate engagement with messages of the topic within a predefined time period (e.g., number of views/favorites of politics-related messages in the past week), average number of broadcasts of messages of a topic within a predefined time period, proportion of connections in the connection graph associated with a given topic (e.g., 25% of the context account's followers are politics-related accounts), and any other indication of a user's interest, engagement, and/or history with a topic.

In one or more embodiments of the invention, the content analysis module (116) includes functionality to weight a ranking score, resulting from the ranking, of each topic of the set of topics based on engagement values associated with the topic(s), and/or select the set of topics representing highly ranked topics based on the weighted ranking score. Thus, for example, topics having a higher engagement value can be weighted more heavily than those having a lower engagement value.

Engagement values can be associated with a message. Examples of an engagement value associated with a message can include, but are not limited to, a number of rebroadcasts of a message by other accounts of the messaging platform, a number of favorites/likes of a message by other accounts of the messaging platform, a number of responses to a message by other accounts of the messaging platform, a number of mentions or references of an authoring account of an unviewed message by other accounts of the messaging platform, a number of followers/connections/friends of the authoring account within the context account's connection graph, an indication of a favorite account by the context account, prior engagement with a conversation including one or more unviewed messages by the context account, and/or an amount of any other activity associated with one or more unviewed messages.

In one or more embodiments of the invention, the content analysis module (116) includes functionality to weight one or more messages based on engagement values associated with the message(s). Thus, for example, messages having a higher engagement value can be weighted more heavily than those having a lower engagement value.

In one or more embodiments of the invention, the content analysis module (116) includes functionality to weight differently the different criteria used to rank and form the content group. For example, the content analysis module (116) may place more weight on the recency of a message than the rank of a topic to which the message belongs.

In one or more embodiments of the invention, the content group represents content associated with a subset of the unviewed messages. For example, there may be a number U of unviewed messages, while the content group generated by the content analysis module (116) includes content relevant to less than U unviewed messages. In another example, there may be a number F unviewed messages authored by favorite accounts associated with the context account, while the content group generated by the content analysis module (116) includes content relevant to a subset of the F unviewed messages.

In one or more embodiments of the invention, the content analysis module (116) includes functionality to provide at least a portion of the content group in response to the request. For example, the content analysis module (116) may provide one or more messages from the content group to the routing module (125), stream repository (144), frontend module (110), client (105), and/or the source of the request.

In one or more embodiments of the invention, the content analysis module (116) includes functionality to receive a selection of a user interface element and provide at least some additional content from the content group in response to the selection. For example, in response to the selection, the content analysis module (116) provides additional content from a favorite account, additional content from a stream (e.g., the next set of messages ranked after the set of messages provided in a first portion of the content group), and/or additional content from the popular stories or topics content group (e.g., additional messages of popular stories or topics related to popular stories or topics that may or may not be related to the first message).

In one or more embodiments of the invention, the content analysis module (116) includes functionality to receive a selection of a user interface element and provide at least some additional content related to the portion of the content group in response to the selection. For example, in response to the selection, the content analysis module (116) can provide additional content related to the content already provided and associated with a favorite account (e.g., additional messages related to a first provided message that may be part of a broader conversation, topic, story, and so on), additional content from a stream (e.g., additional messages related to a first provided message that may be part of a broader conversation, topic, story, and so on), and/or provides additional content from a popular story or topic (e.g., additional messages about the story or additional links to additional pages related to the story, or topic, respectively).

In one or more embodiments of the invention, a user interface generation module includes functionality to receive a portion of a content group, where the content group was generated by applying grouping criteria for grouping content based on unviewed messages. For example, the user interface generation module may receive the portion of the content group from the messaging platform (100).

In one or more embodiments of the invention, the user interface generation module includes functionality to receive the portion of the content group in response to a request associated with a context account. In one or more embodiments of the invention, the content group may include messages unviewed by the context account. In one or more embodiments of the invention, the content group may include messages grouped based on content from their favorite accounts, highlights in their stream of messages, popular stories, the best topics in their stream of messages, and any other grouping of content.

In one or more embodiments of the invention, the user interface generation module includes functionality to display the portion of the content group in reverse chronological order. For example, the portion of the content group may belong to a larger set of content in the content group, and the user interface element indicates the existence of the larger set of content. The larger set of content may include content related to and/or in the same category of the portion of the content group.

Figure 2A:
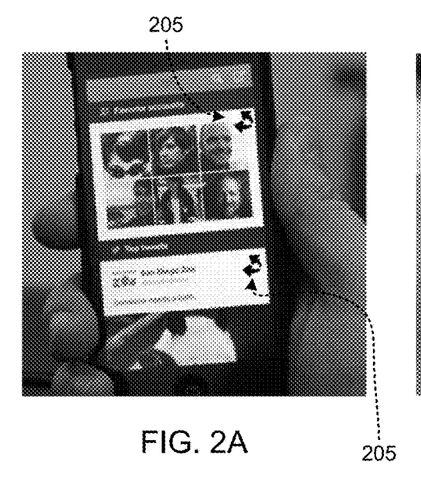
FIGS. 2A-2G show example user interfaces in accordance with one or more embodiments of the invention.

In one or more embodiments of the invention, the user interface generation module includes functionality to display user interface elements corresponding to favorite accounts associated with the portion of the content group. For example, in FIG. 2A, user interface elements in the form of icons representing favorite accounts are displayed. In one or more embodiments of the invention, the portion of the content group associated with the favorite accounts is displayed in reverse chronological order concurrent with the favorite account icons. For example, in FIG. 2A, messages associated with the displayed favorite accounts are displayed below the displayed favorite accounts.

In one or more embodiments of the invention, the user interface generation module includes functionality to display, in response to a selection of a user interface element corresponding to a favorite account, content in the portion of the content group associated with the selected favorite account. For example, in FIG. 2A, if an icon representing a favorite account is selected, the user interface generation module displays messages associated with only the favorite account (e.g., in place of all of the messages associated with all of the displayed favorite accounts). In one or more embodiments of the invention, the user interface generation module includes functionality to continue displaying the other icons representing the other favorite accounts to allow additional selection thereof. In one or more embodiments of the invention, the user interface generation module includes functionality to display a profile page of a selected favorite account, where messages associated with the favorite account are displayed.

In one or more embodiments of the invention, the user interface generation module includes functionality to display at least a portion of a content group corresponding to highlights of the context account's unviewed messages. For example, in FIG. 2B, highlighted messages from the context account's stream are displayed.

In one or more embodiments of the invention, the user interface generation module includes functionality to display at least a portion of a content group corresponding to popular stories from a context account's unviewed messages. For example, in FIGS. 2C and 2D, one or more messages of popular stories from the context account's stream are displayed. Referring to FIG. 2D, user accounts in the context account's connection graph that have broadcasted or engaged with the popular story may be shown.

In one or more embodiments of the invention, the user interface generation module includes functionality to display user interface elements corresponding to one or more topic-related content groups. For example, in FIGS. 2E and 2F, a set of topics from the context account's stream are displayed. Elements representing user accounts in the context account's connection graph that have broadcasted or engaged with the set of topics may be shown. In one or more embodiments of the invention, the user interface generation module includes functionality to display additional user interface elements in the form of icons representing the user accounts, where the user accounts are associated with the topics.

In one or more embodiments of the invention, the user interface generation module includes functionality to display, in response to a selection of a user interface element corresponding to topics, content in the portion of the content group associated with the selected topic.

In one or more embodiments of the invention, the user interface generation module includes functionality to display a page including portions of content from more than one content group. For example, in FIG. 2G, a section corresponding to a content group of content associated with favorite accounts and a section corresponding to content group of stream highlights of a context account are both displayed. In another example, a page concurrently including sections corresponding to favorite accounts, stream highlights, popular stories, stream topics, and any other type of content group is displayed.

In one or more embodiments of the invention, the user interface generation module includes functionality to display at least a portion of the content group concurrent with a user interface element indicating an existence of additional content in the content group. For example, in FIG. 2A, two user interface elements 205 indicate an existence of additional content in content groups. In one example, the user interface element 205 corresponding to the favorite accounts section indicates the existence of additional favorite accounts. Further, the user interface element 205 corresponding to each message in the Top tweets section indicates the existence of additional content in the Top tweets content group related to the message.

Figure 2B:
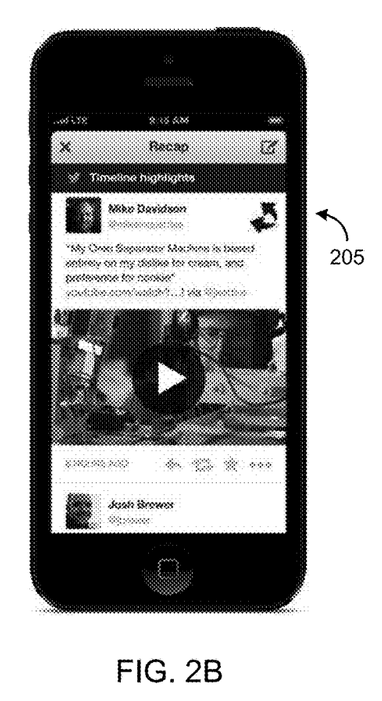
Figure 2C:
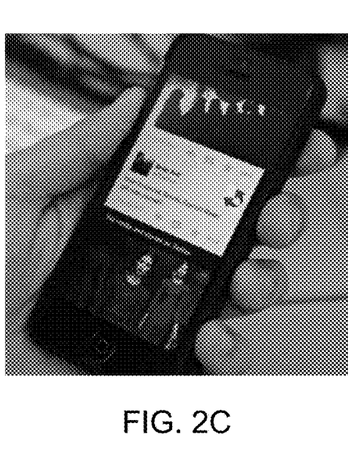
Figure 2D:
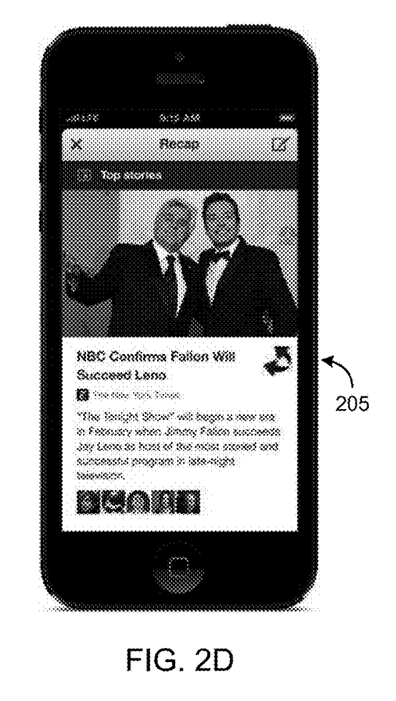
Figure 2E:
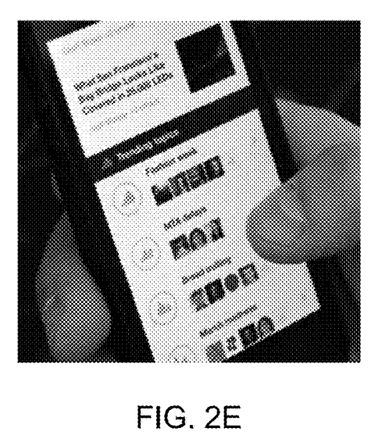
Figure 2F:
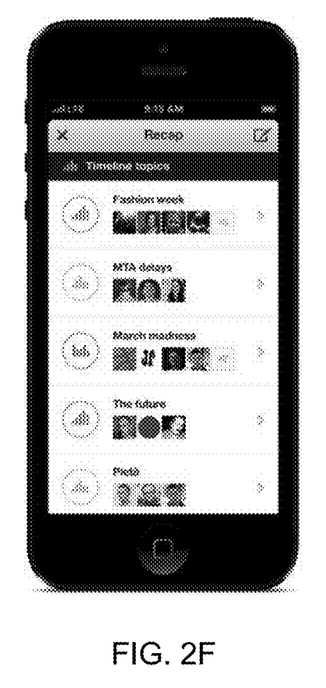
Figure 2G:
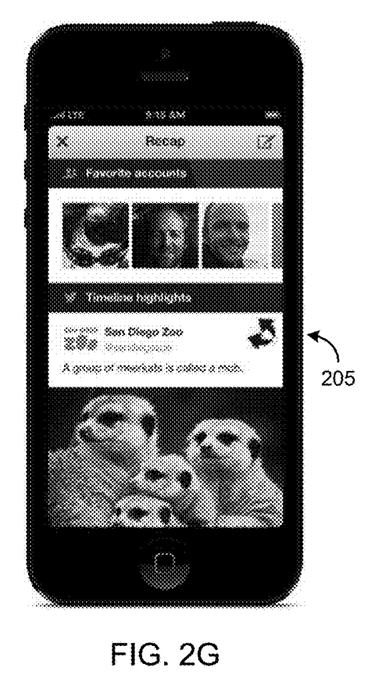

In an example, in FIG. 2B, the user interface element 205 corresponding to each message in the Stream highlights section indicates the existence of additional content in the Stream highlights content group related to the message. In another example, in FIG. 2D, the user interface element 205 corresponding to each message in the Top stories section indicates the existence of additional content in a content group, including highly ranked stories, related to the message.

In one or more embodiments of the invention, the user interface generation module includes functionality to receive a selection of the user interface element. For example, the user interface generation module may receive the selection after a user selects the user interface element 205 in FIGS. 2A, 2B, 2D, and/or 2G.

In one or more embodiments of the invention, the user interface generation module includes functionality to provide for display, in response to the selection, at least some of the additional content from the content group.

Figure 3A:
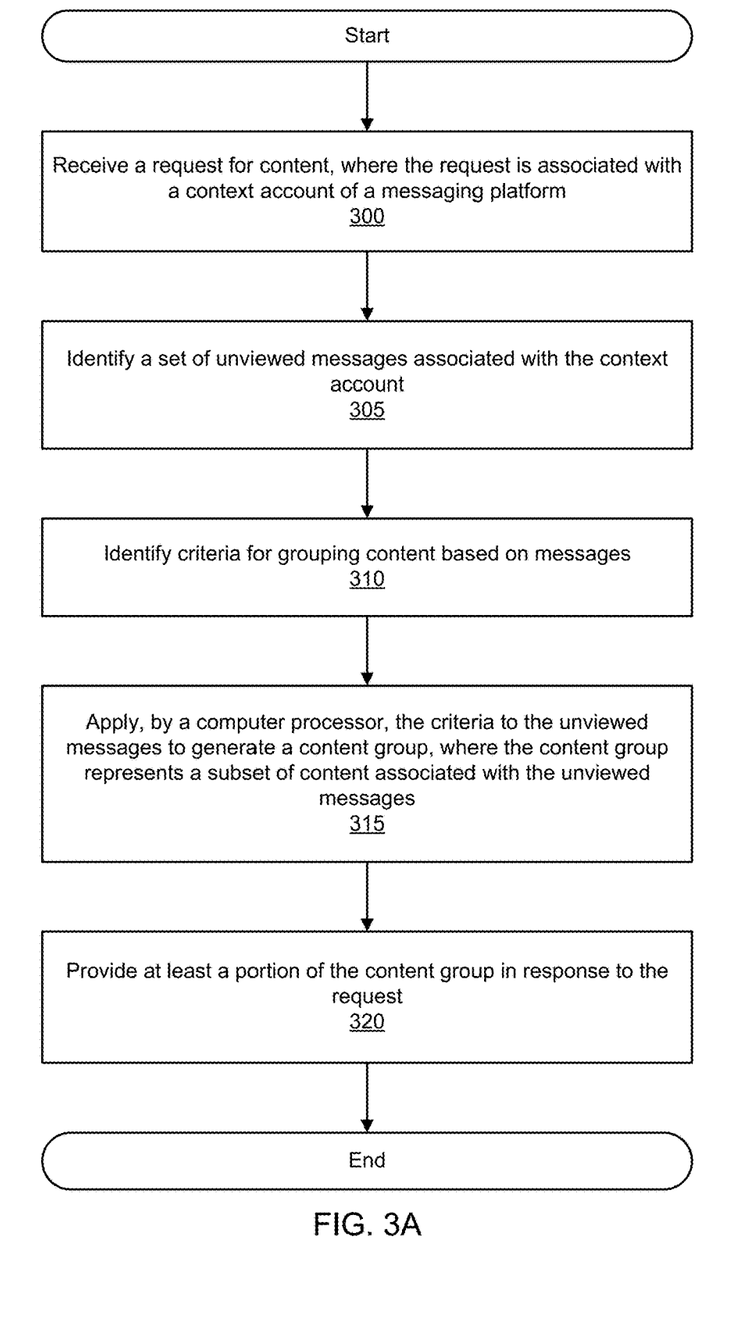
FIGS. 3A and 3B show flowcharts in accordance with one or more embodiments of the invention.

FIG. 3A shows a flowchart of a method for message selection and presentation (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 3A should not be construed as limiting the scope of the invention.

In STEP 300, a request for content is received, where the request is associated with a context account of a messaging platform. In one or more embodiments of the invention, the request is received from a client device associated with the context account (e.g., a mobile device). The request may be for content that has not been viewed by the context account (e.g., unviewed messages during a period of inactivity of the context account).

In STEP 305, a set of unviewed messages associated with the context account is identified. For example, messages that are associated with the context account (e.g., messages within the connection graph of the context account) may have been stored, and one or more of the messages may have been viewed by the context account, while one or more of the messages may not have been viewed by the context account. The unviewed messages associated with the context account may be identified.

In STEP 310, one or more criteria for grouping content based on messages is identified. In one or more embodiments, the grouping criteria may be used to identify content associated with favorite accounts, message highlights in a stream of messages, popular stories represented by messages, message topics in a stream of messages, and/or any other grouping criteria that may be considered to group content.

In STEP 315, the criteria are applied, by a computer processor, to the unviewed messages to generate a content group, where the content group represents a subset of content associated with the unviewed messages. A content group may refer to any grouping of content associated with messages of the messaging platform.

For example, a subset of unviewed messages may be selected from a message stream of the context account for inclusion in the content group. The stream may include content broadcasted by or engaged with by accounts having a predefined graph relationship with the context account in the connection graph.

In another example, one or more content groups may be generated based on one or more favorite accounts associated with the context account. Each content group may be generated based on messages that are associated with and/or authored by the favorite accounts and unviewed by the context account.

In another example, criteria that can be used to generate content groups based on stories unviewed by the context account and broadcasted or engaged with by user accounts in the context account's connection graph are applied. Content associated with popular uniform resource locators (URLs) and/or other references shared across messages of the messaging platform that are associated with stories may be grouped.

In another example, criteria that can be used to form a content group of unviewed messages associated with an identified topic can be applied. For example, one or more topics may be identified based on one or more viewed or unviewed messages and content associated with the topics may be identified for inclusion in one or more content groups.

In one or more embodiments of the invention, some or all of the unviewed content and/or messages may be ranked based on the criteria, and a ranking score may be associated with the ranked content and/or messages. The content group may be formed based on the ranking. When more than one criteria is used to rank the content and/or messages, the different criteria may be weighted differently to form the content group.

In STEP 320, at least a portion of the content group is provided in response to the request. For example, all unviewed content and/or messages may be ranked and a top percentage (e.g., top 5% messages) and/or number (e.g., top 10 messages) of the messages in a content group may be provided in response to the request.

Figure 3B:
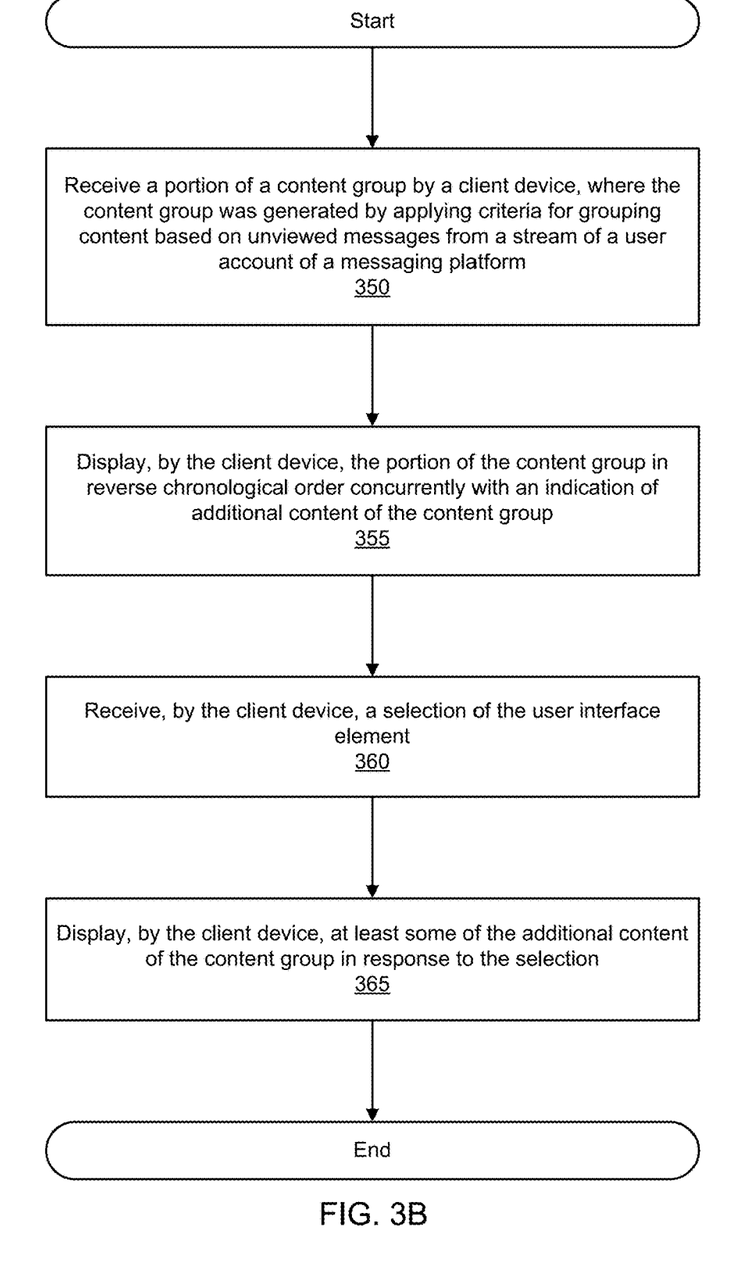
Figure 4:
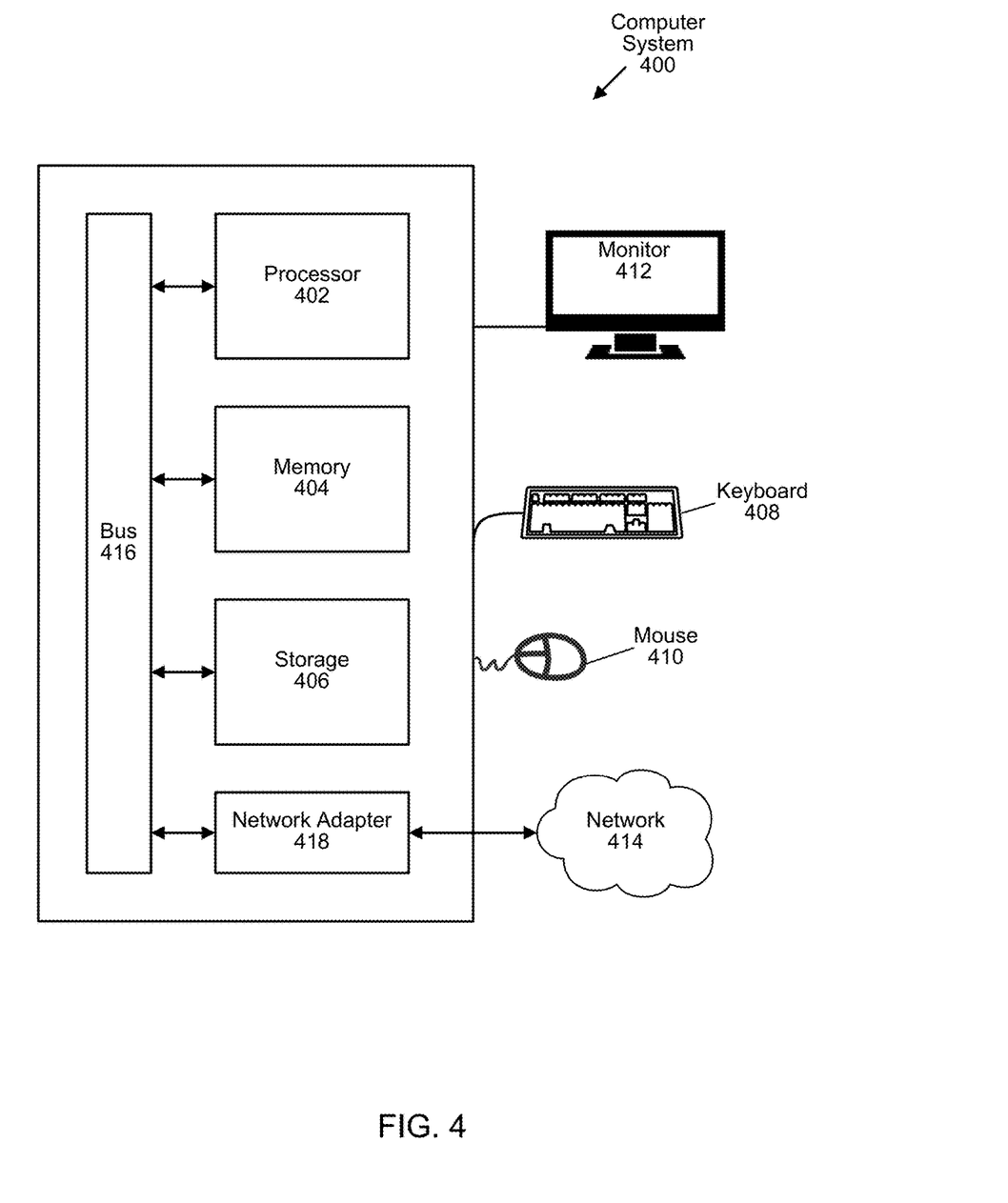
FIG. 4 shows a computer system in accordance with one or more embodiments of the invention.

FIG. 3B shows a flowchart of a method for message selection and presentation (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 3B should not be construed as limiting the scope of the invention.

In STEP 350, a portion of a content group is received by a client device, where the content group was generated by applying grouping criteria for grouping content based on unviewed messages from a stream of a user account of a messaging platform. For example, the portion of the content group may be received in response to a request for content previously sent by the client device.

In STEP 355, the portion of the content group is displayed by the client device in reverse chronological order concurrently with an indication of additional content of the content group. For example, the portion of the content group may be displayed in reverse chronological order of messages in a stream of messages. In another example, messages associated with favorite accounts of a context account may be displayed in reverse chronological order of a broadcasting or engagement time by the favorite accounts. In another example, topic or story content groups may be displayed in reverse chronological order based on the most recently broadcasted message within the content group, and/or messages within the topic or story content groups may be displayed in reverse chronological order.

In STEP 360, a selection of the user interface element is received by the client device. For example, a user may select a hyperlink indicating that additional content of the content group is available for viewing.

In STEP 365, at least some of the additional content of the content group is displayed by the client device in response to the selection. For example, in response to the selection, additional content from a favorite account, additional content from a stream (e.g., the next set of messages ranked after the set of messages provided in a first portion of the content group), and/or additional content from the popular stories or topics content group (e.g., additional messages of popular stories or topics related to popular stories or topics that may or may not be related to the first message) may be provided.

In another example, at least some additional content related to the portion of the content group is provided in response to the selection. For example, in response to the selection, additional content related to the content already provided and associated with a favorite account (e.g., additional messages related to a first provided message that may be part of a broader conversation, topic, story, and so on), additional content from a stream (e.g., additional messages related to a first provided message that may be part of a broader conversation, topic, story, and so on), and/or additional content from a popular story or topic (e.g., additional messages about the story or additional links to additional pages related to the story, or topic, respectively) is provided.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for message selection, comprising:
receiving a request for content, wherein the request is associated with a context account of a messaging platform;
identifying a set of unviewed messages in a message stream of the context account, wherein the set of unviewed messages were included in the message stream subsequent to the most recent viewing of the message stream by the context account, and wherein the unviewed messages are associated with accounts of the messaging platform having a predefined graph relationship with the context account;
identifying a plurality of distinct grouping criteria for grouping messages, wherein the plurality of grouping criteria include a popularity of a given message in the messaging platform and a relationship between the context account and an authoring account of the given message;
applying, by a computer processor, the plurality of grouping criteria to the unviewed messages to generate a plurality of content groups, each content group providing a grouping of unviewed messages of the messaging platform, wherein:
each content group is associated with a subset of the unviewed messages identified according to the particular grouping criteria for that content group, and
applying the grouping criteria for each generated content group comprises:
ranking the set of unviewed messages of the content group according to a plurality of message criteria, wherein each message criterion is assigned a corresponding weight to provide an overall ranking value to each unviewed message, and
selecting, based on ranking the set of unviewed messages, the subset of the unviewed messages for inclusion in the content group, wherein selecting comprises excluding at least one message of the set of unviewed messages from inclusion in the content group based on ranking the set of unviewed messages; and
providing, in response to the request, one or more of the plurality of content groups and in response to a user selection of a particular content group, providing at least a portion of the content group for display by a client device associated with the context account.

2. The method of claim 1, further comprising:
identifying favorite accounts of the context account;
selecting messages from the set of unviewed messages that are authored by the favorite accounts to form a group of messages;
ranking the group of messages based on a message criterion; and
selecting, based on ranking the group of messages, the subset of the unviewed messages from the group of messages for inclusion in the content group, wherein the subset of the unviewed messages is displayed by the client device.

3. The method of claim 2, wherein the favorite accounts are identified based on a favorite accounts criterion, and wherein the favorite accounts criterion is based on at least one selected from a group consisting of an indication of favorite accounts by the context account, a predefined graph relationship between the favorite accounts and the context account, and a frequency and recency of engagement between the favorite accounts and the context account.

4. The method of claim 2, wherein the message criterion is based on at least one selected from a group consisting of a recency and frequency of engagement with a message in the group of messages by a favorite account and geographical locations of a broadcasting user account of a message in the group of messages and the context account.

5. The method of claim 1, further comprising:
matching the set of unviewed messages with a set of topics to form a set of topic groups;
ranking the set of topic groups based on a topics criterion; and
selecting, based on ranking the set of topic groups, a subset of the topic groups for inclusion in the content group, wherein the subset of the topic groups are displayed with their matched messages by the client device.

6. The method of claim 5, further comprising dynamically adding and removing topics from the set of topics based at least on a recency and a frequency of keywords and phrases among messages broadcasted by the messaging platform.

7. The method of claim 5, wherein ranking the set of topic groups further comprises determining an average ranking score for each topic of the set of topic groups based on ranking scores for individual messages of the topic.

8. The method of claim 5, wherein selecting the subset of the topic groups comprises:
applying a weighted interest score for each topic of the set of topics, wherein the weighted interest score is an estimate of user interest in the topic.

9. The method of claim 5, wherein the topics criterion is based on at least one selected from a group consisting of a recency of viewing content associated with a topic, a frequency of viewing content associated with a topic, engagement with content associated with a topic, and a geographical proximity between the context account and the authoring account of content associated with a topic.

10. The method of claim 1, further comprising:
identifying a plurality of stories referenced by the set of unviewed messages;
ranking the plurality of stories based on a stories criterion; and
selecting the subset of the unviewed messages corresponding to a highest ranking story of the plurality of stories, wherein at least one of the subset of the unviewed messages is displayed by the client device concurrently with an indication of the highest ranking story.

11. The method of claim 10, further comprising:
selecting a description for the highest ranking story, wherein the indication of the highest ranking story comprises the description.

12. The method of claim 10, wherein the stories criterion is based on at least one selected from a group consisting of engagement with references to the plurality of stories by user accounts within a connection graph of the context account, and a popularity score of an authoring account of at least one unviewed message associated with at least one of the plurality of stories.

13. The method of claim 10, wherein the stories criterion is based on a count of references associated with each story.

14. The method of claim 10, wherein the reference is a uniform resource locator (URL) and the story is a web page referenced by the URL.

15. A system for message selection, comprising:
a computer processor;
a content-analysis module executing on the computer processor and configured to:

receive a request for content, wherein the request is associated with a context account;

identify a set of unviewed messages in a message stream of the context account, wherein the set of unviewed messages were included in the message stream subsequent to the most recent viewing of the message stream by the context account, and wherein the unviewed messages are associated with accounts of the messaging platform having a predefined graph relationship with the context account;

identify a plurality of distinct grouping criteria for grouping messages, wherein the plurality of grouping criteria include a popularity of a given message in the messaging platform and a relationship between the context account and an authoring account of the given message;

apply the plurality of grouping criteria to the unviewed messages to generate a plurality of content groups, each content group providing a grouping of unviewed messages of the messaging platform, wherein:

each content group is associated with a subset of the unviewed messages identified according to the particular grouping criteria for that content group, and applying the grouping criteria for each generated content group comprises:

ranking the set of unviewed messages of the content group according to a plurality of message criteria, wherein each message criterion is assigned a corresponding weight to provide an overall ranking value to each unviewed message, and selecting, based on ranking the set of unviewed messages, the subset of the unviewed messages for inclusion in the content group, wherein selecting comprises excluding at least one message of the set of unviewed messages from inclusion in the content group based on ranking the set of unviewed messages; and provide, in response to the request, one or more of the plurality of content groups and in response to a user selection of a particular content group, providing at least a portion of the content group for display by a client device associated with the context account.

16. The system of claim 15, wherein the content-analysis module is further configured to:

identify favorite accounts of the context account;

select messages from the set of unviewed messages that are authored by the favorite accounts to form a group of messages;

rank the group of messages based on a message criterion; and select, based on ranking the group of messages, the subset of the unviewed messages from the group of messages for inclusion in the content group, wherein the subset of the unviewed messages is displayed by the client device.

17. The system of claim 16, wherein the favorite accounts are identified based on a favorite accounts criterion, and wherein the favorite accounts criterion is based on at least one selected from a group consisting of an indication of favorite accounts by the context account, a predefined graph relationship between the favorite accounts and the context account, and a frequency and recency of engagement between the favorite accounts and the context account.

18. The system of claim 16, wherein the message criterion is based on at least one selected from a group consisting of a recency and frequency of engagement with a message in the group of messages by a favorite account and geographical locations of a broadcasting user account of a message in the group of messages and the context account.

19. The system of claim 15, wherein the content-analysis module is further configured to:

match the set of unviewed messages with a set of topics to form a set of topic groups;

rank the set of topic groups based on a topics criterion; and select, based on ranking the set of topic groups, a subset of the topic groups for inclusion in the content group, wherein the subset of the topic groups are displayed with their matched messages by the client device.

20. The system of claim 19, wherein the content-analysis module is further configured to dynamically add and removing topics from the set of topics based at least on a recency and a frequency of keywords and phrases among messages broadcasted by the messaging platform.

21. The system of claim 19, wherein ranking the set of topic groups further comprises determining an average ranking score for each topic of the set of topic groups based on ranking scores for individual messages of the topic.

22. The system of claim 19, wherein selecting the subset of the topic groups comprises:

applying a weighted interest score for each topic of the set of topics, wherein the weighted interest score is an estimate of user interest in the topic.

23. The system of claim 19, wherein the topics criterion is based on at least one selected from a group consisting of a recency of viewing content associated with a topic, a frequency of viewing content associated with a topic, engagement with content associated with a topic, and a geographical proximity between the context account and the authoring account of content associated with a topic.

24. The system of claim 15, wherein the content-analysis module is further configured to:

identify a plurality of stories referenced by the set of unviewed messages;

rank the plurality of stories based on a stories criterion; and select the subset of the unviewed messages corresponding to a highest ranking story of the plurality of stories, wherein at least one of the subset of the unviewed messages is displayed by the client device concurrently with an indication of the highest ranking story.

25. The system of claim 24, wherein the content-analysis module is further configured to:

select a description for the highest ranking story, wherein the indication of the highest ranking story comprises the description.

26. The system of claim 24, wherein the stories criterion is based on at least one selected from a group consisting of engagement with references to the plurality of stories by user accounts within a connection graph of the context account, and a popularity score of an authoring account of at least one unviewed message associated with at least one of the plurality of stories.

27. The system of claim 24, wherein the stories criterion is based on a count of references associated with each story.

28. The system of claim 24, wherein the reference is a uniform resource locator (URL) and the story is a web page referenced by the URL.

29. A computer program product, encoded on one or more non-transitory computer-readable media, comprising software that when executed by one or more computers cause the one or more computers to perform operations comprising:
- receiving a request for content, wherein the request is associated with a context account of a messaging platform;
- identifying a set of unviewed messages in a message stream of the context account, wherein the set of unviewed messages were included in the message stream subsequent to the most recent viewing of the message stream by the context account, and wherein the unviewed messages are associated with accounts of the messaging platform having a predefined graph relationship with the context account;
- identifying a plurality of distinct grouping criteria for grouping messages, wherein the plurality of grouping criteria include a popularity of a given message in the messaging platform and a relationship between the context account and an authoring account of the given message;
- applying, by a computer processor, the plurality of grouping criteria to the unviewed messages to generate a plurality of content groups, each content group providing a grouping of unviewed messages of the messaging platform, wherein:
  - each content group is associated with a subset of the unviewed messages identified according to the particular grouping criteria for that content group, and
  - applying the grouping criteria for each generated content group comprises:
    - ranking the set of unviewed messages of the content group according to a plurality of message criteria, wherein each message criterion is assigned a corresponding weight to provide an overall ranking value to each unviewed message, and
    - selecting, based on ranking the set of unviewed messages, the subset of the unviewed messages for inclusion in the content group, wherein selecting comprises excluding at least one message of the set of unviewed messages from inclusion in the content group based on ranking the set of unviewed messages; and
- providing, in response to the request, one or more of the plurality of content groups and in response to a user selection of a particular content group, providing at least a portion of the content group for display by a client device associated with the context account.

30. The computer program product of claim 29, further comprising software that when executed cause the one or more computers to perform operations comprising:
- identifying favorite accounts of the context account;
- selecting messages from the set of unviewed messages that are authored by the favorite accounts to form a group of messages;
- ranking the group of messages based on a message criterion; and
- selecting, based on ranking the group of messages, the subset of the unviewed messages from the group of messages for inclusion in the content group, wherein the subset of the unviewed messages is displayed by the client device.

31. The computer program product of claim 30, wherein the favorite accounts are identified based on a favorite accounts criterion, and wherein the favorite accounts criterion is based on at least one selected from a group consisting of an indication of favorite accounts by the context account, a predefined graph relationship between the favorite accounts and the context account, and a frequency and recency of engagement between the favorite accounts and the context account.

32. The computer program product of claim 30, wherein the message criterion is based on at least one selected from a group consisting of a recency and frequency of engagement with a message in the group of messages by a favorite account and geographical locations of a broadcasting user account of a message in the group of messages and the context account.

33. The computer program product of claim 29, further comprising software that when executed cause the one or more computers to perform operations comprising:
- matching the set of unviewed messages with a set of topics to form a set of topic groups;
- ranking the set of topic groups based on a topics criterion; and
- selecting, based on ranking the set of topic groups, a subset of the topic groups for inclusion in the content group, wherein the subset of the topic groups are displayed with their matched messages by the client device.

34. The computer program product of claim 33, further comprising software that when executed cause the one or more computers to perform operations comprising dynamically adding and removing topics from the set of topics based at least on a recency and a frequency of keywords and phrases among messages broadcasted by the messaging platform.

35. The computer program product of claim 33, wherein ranking the set of topic groups further comprises determining an average ranking score for each topic of the set of topic groups based on ranking scores for individual messages of the topic.

36. The computer program product of claim 33, wherein selecting the subset of the topic groups comprises:
- applying a weighted interest score for each topic of the set of topics, wherein the weighted interest score is an estimate of user interest in the topic.

37. The computer program product of claim 33, wherein the topics criterion is based on at least one selected from a group consisting of a recency of viewing content associated with a topic, a frequency of viewing content associated with a topic, engagement with content associated with a topic, and a geographical proximity between the context account and the authoring account of content associated with a topic.

38. The computer program product of claim 29, further comprising software that when executed cause the one or more computers to perform operations comprising:
- identifying a plurality of stories referenced by the set of unviewed messages;
- ranking the plurality of stories based on a stories criterion; and
- selecting the subset of the unviewed messages corresponding to a highest ranking story of the plurality of stories, wherein at least one of the subset of the unviewed messages is displayed by the client device concurrently with an indication of the highest ranking story.

39. The computer program product of claim 38, further comprising software that when executed cause the one or more computers to perform operations comprising: selecting a description for the highest ranking story, wherein the indication of the highest ranking story comprises the description.

40. The computer program product of claim 38, wherein the stories criterion is based on at least one selected from a group consisting of engagement with references to the plurality of stories by user accounts within a connection graph of the context account, and a popularity score of an authoring account of at least one unviewed message associated with at least one of the plurality of stories.

41. The computer program product of claim 38, wherein the stories criterion is based on a count of references associated with each story.

42. The computer program product of claim 38, wherein the reference is a uniform resource locator (URL) and the story is a web page referenced by the URL.

* * * * *